United States Patent
Ying et al.

(10) Patent No.: US 9,589,214 B2
(45) Date of Patent: Mar. 7, 2017

(54) APPARATUS AND METHODS FOR DISPENSING AT LEAST ONE SEGMENT OF A PRINTED MEDIA SHEET WITH A PLURALITY OF SEGMENTS

(71) Applicant: Venture Corporation Limited, Singapore (SG)

(72) Inventors: Sea Mang Ying, Singapore (SG); Tzy Woei Chu, Singapore (SG); Xin Hua Jin, Singapore (SG)

(73) Assignee: Venture Corporation Limited, Singapore (SG)

( * ) Notice: Subject to any disclaimer, the term of this patent is extended or adjusted under 35 U.S.C. 154(b) by 0 days.

(21) Appl. No.: 14/369,617

(22) PCT Filed: Jan. 9, 2013

(86) PCT No.: PCT/SG2013/000012
§ 371 (c)(1),
(2) Date: Jun. 27, 2014

(87) PCT Pub. No.: WO2013/105901
PCT Pub. Date: Jul. 18, 2013

(65) Prior Publication Data
US 2014/0362394 A1    Dec. 11, 2014

(30) Foreign Application Priority Data

Jan. 9, 2012 (SG) ................ 201200214-3

(51) Int. Cl.
*G06K 15/16* (2006.01)
*B41J 11/00* (2006.01)
(Continued)

(52) U.S. Cl.
CPC .......... *G06K 15/16* (2013.01); *B41J 11/0095* (2013.01); *B41J 13/106* (2013.01); *B65C 9/1803* (2013.01);
(Continued)

(58) Field of Classification Search
None
See application file for complete search history.

(56) References Cited

U.S. PATENT DOCUMENTS 5,854,696 A * 12/1998 Yun ............................... 358/498
7,552,920 B2 * 6/2009 Morinaga ...................... 271/145
(Continued)

FOREIGN PATENT DOCUMENTS

| EP | 1236576 B1 | 2/2005 |
| EP | 2305480 A1 | 4/2011 |

(Continued)

OTHER PUBLICATIONS

Foreign Communication From a Related Counterpart Application, International Search Report dated Apr. 15, 2013, International Application No. PCT/SG2013/000012 filed on Jan. 9, 2013.
(Continued)

*Primary Examiner* — Ming Hon

(57) ABSTRACT

There is provided an apparatus and a method for dispensing printed labels from a printer. The printed labels may be prepared on a need basis, such that each printed label is either held in the apparatus or ejected from the apparatus. Some advantages of the apparatus and method include prolonging a lifespan for a print head, and minimization of transition error on a media used for printing.

8 Claims, 6 Drawing Sheets

(51) Int. Cl.
    B41J 13/10      (2006.01)
    B65C 9/18       (2006.01)
    B65C 9/42       (2006.01)
    B65C 11/02      (2006.01)
    G06K 15/00      (2006.01)
    B65C 9/00       (2006.01)

(52) U.S. Cl.
    CPC ............. *B65C 9/1896* (2013.01); *B65C 9/42* (2013.01); *B65C 11/0289* (2013.01); *G06K 15/4065* (2013.01); *B65C 2009/0084* (2013.01); *B65C 2210/0072* (2013.01)

(56) References Cited

U.S. PATENT DOCUMENTS

| | | | |
|---|---|---|---|
| 2006/0013634 A1* | 1/2006 | Harada | B41J 3/4075 400/615.2 |
| 2006/0162842 A1 | 7/2006 | Hiroike et al. | |
| 2006/0251438 A1* | 11/2006 | Uchitani et al. | 399/50 |
| 2008/0069624 A1* | 3/2008 | Sakano | B41J 11/0095 400/629 |
| 2008/0223512 A1* | 9/2008 | Sievel | B41J 3/445 156/250 |
| 2009/0297247 A1* | 12/2009 | Yaguchi | B41J 3/44 400/621 |
| 2012/0163880 A1* | 6/2012 | Kuroki et al. | 399/301 |
| 2014/0099148 A1* | 4/2014 | Obata | B41J 3/4075 400/236.2 |

FOREIGN PATENT DOCUMENTS

| | | |
|---|---|---|
| EP | 2380745 A2 | 10/2011 |
| GB | 2379918 A | 3/2003 |
| JP | 2000177190 A | 6/2000 |
| WO | 8504503 | 10/1985 |
| WO | 9729434 A1 | 8/1997 |
| WO | 9747469 | 12/1997 |
| WO | 2008046222 A1 | 4/2008 |
| WO | 2011152825 A1 | 12/2011 |
| WO | 2013105901 A1 | 7/2013 |

OTHER PUBLICATIONS

Foreign Communication From a Related Counterpart Application, International Preliminary Report on Patentability dated Dec. 12, 2013, International Application No. PCT/SG2013/000012 filed on Jan. 9, 2013.

Foreign Communication from a Related Counterpart Application, Supplemental European Search Report mail date Aug. 4, 2015, EP Application No. 13 73 5850.

* cited by examiner

APPARATUS AND METHODS FOR DISPENSING AT LEAST ONE SEGMENT OF A PRINTED MEDIA SHEET WITH A PLURALITY OF SEGMENTS

CROSS-REFERENCE TO RELATED APPLICATIONS

This application is a filing under 35 U.S.C. 371 as the National Stage of International Application No. PCT/SG2013/000012, filed Jan. 9, 2013, entitled "AN APPARATUS AND METHODS FOR DISPENSING AT LEAST ONE SEGMENT OF A PRINTED MEDIA SHEET WITH A PLURALITY OF SEGMENTS", which claims the benefit of and priority to Singapore Application No. 201200214-3, filed Jan. 9, 2012, both of which are incorporated herein by reference in their entirety for all purposes.

FIELD OF INVENTION

The present invention relates an apparatus and methods for dispensing at least one segment of a printed media sheet with a plurality of segments.

BACKGROUND

Currently, there are printers which do not allow print media to be parked in a printing zone of the printer, and this means that a user would have to conscientiously remove the printed material to prevent damage to the printed material. This is inconvenient to the user.

Furthermore, current printers typically have integrated dispensors which cannot be controlled separately from the printer. This may lead to issues pertaining to either print quality or jammed/crushed media, which is also undesirable to the user.

In view of the aforementioned, it is evident that there are issues pertaining to the dispensing of printed media for printers nowadays which should be addressed such that inconveniences to the user are minimised.

SUMMARY

In a first aspect, there is provided an apparatus for dispensing at least one segment on a printed media sheet with a plurality of segments. The apparatus may be coupled to a printer, with a printer head of the printer being capped when the at least one segment is held at a predetermined position.

The apparatus includes a first detector being configured for determining a presence of the at least one segment; a driving mechanism for moving the media sheet; an output drive roller; a movable structure for contacting a second surface of the media sheet, the movable structure being able to grip the media sheet together with the output drive roller; and a second detector being configured for determining a mode of the movable structure, the mode including a non-contact mode and a contact mode. The at least one segment may be a printed label.

It is advantageous that the movable structure is configured to contact the second surface of the media sheet when the first detector determines the presence of the at least one segment at a predetermined position, the predetermined position being at a dispensing opening, and when the second detector determines the contact mode of the movable structure.

The first detector preferably includes either a light sensor or a load sensor. In addition, the at least one segment is singulated from the media sheet when the at least one segment is held at the predetermined position. The second detector may be a sensor which is configured to be triggered when the movable structure is in one of the modes.

The driving mechanism may be configured to back-track the media sheet when the at least one segment is singulated from the media sheet. The output drive roller may be configured to move in a single direction, the single direction being enabled when the output drive roller is coupled to a one-way clutch.

It is preferable that the non-contact mode is when the movable structure is not in contact with the second surface of the media sheet and the contact mode being when the movable structure is in contact with the second surface of the media sheet. It is also preferable that movement of the movable structure is modulated with a biasing mechanism.

The at least one segment may be ejected subsequent to being held at the predetermined position.

In a second aspect, there is provided a method for dispensing at least one segment on a printed media sheet with a plurality of segments in a dispenser of the at least one segment.

The method includes printing on at least one segment of the media sheet at a print zone; singulating the at least one printed segment of the media sheet; holding onto the at least one printed segment of the media sheet; and capping the print head at the print zone when the at least one printed segment is held beyond a predetermined period of between five and thirty seconds. The at least one printed segment is a printed label and it is advantageous that capping the print head minimizes exposure of the print head.

The method may further include either ejecting or removing the at least one printed segment of the media sheet and retreating of the media sheet away from the print zone.

In a final aspect, there is provided a method for dispensing at least one segment on a printed media sheet with a plurality of segments in the aforementioned apparatus. The method includes detecting a presence of the at least one segment at a predetermined position, the predetermined position being at a dispensing opening; detecting a contact mode of the movable structure of the apparatus; and holding onto the at least one printed segment of the media sheet at the predetermined position.

The method further may include either ejecting or removing the at least one printed segment of the media sheet. The at least one printed segment is preferably a printed label.

DESCRIPTION OF FIGURES

In order that the present invention may be fully understood and readily put into practical effect, there shall now be described by way of non-limitative example only preferred embodiments of the present invention, the description being with reference to the accompanying illustrative figures.

DESCRIPTION OF PREFERRED EMBODIMENTS

Embodiments of the present invention, as described hereinafter, relate to an apparatus and a method for dispensing printed labels from a printer. Embodiments of the invention may be employed in circumstances where printed labels are prepared on a need basis, such that each printed label is either held in the apparatus or ejected from the apparatus.

Some advantages of the invention which will be evident from the disclosure of the subsequent paragraphs include prolonging a lifespan for a print head, and minimisation of transition error on a media used for printing.

Figure 1:
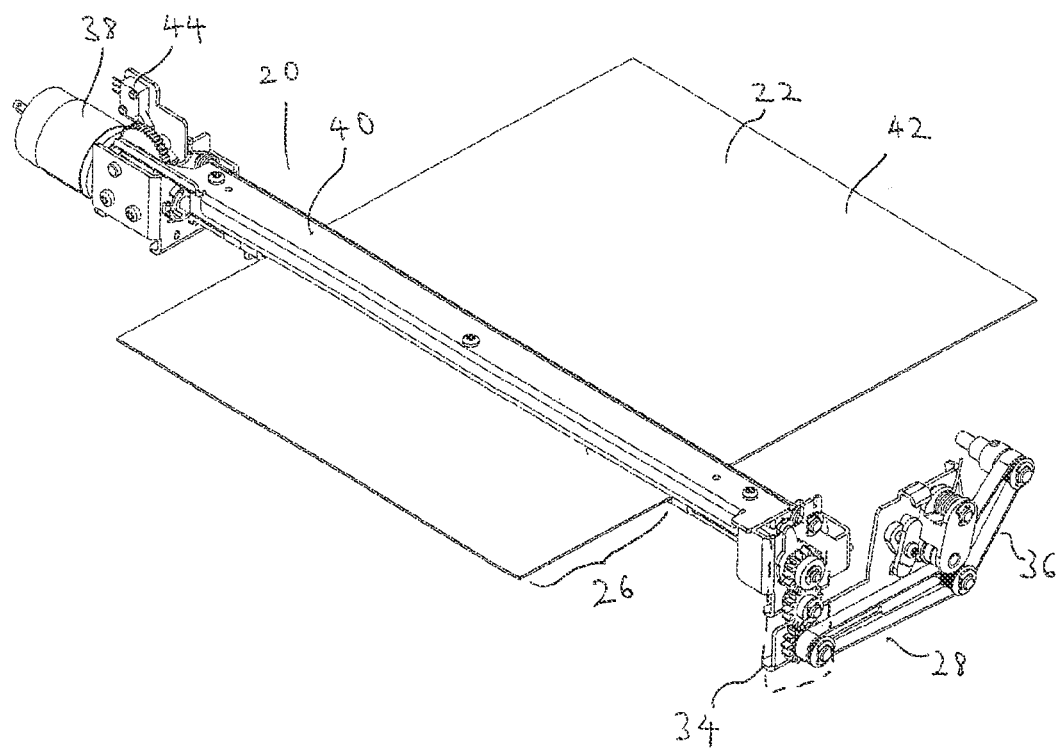
FIG. 1 shows a top perspective view of a preferred embodiment of an apparatus of the present invention.
Figure 2:
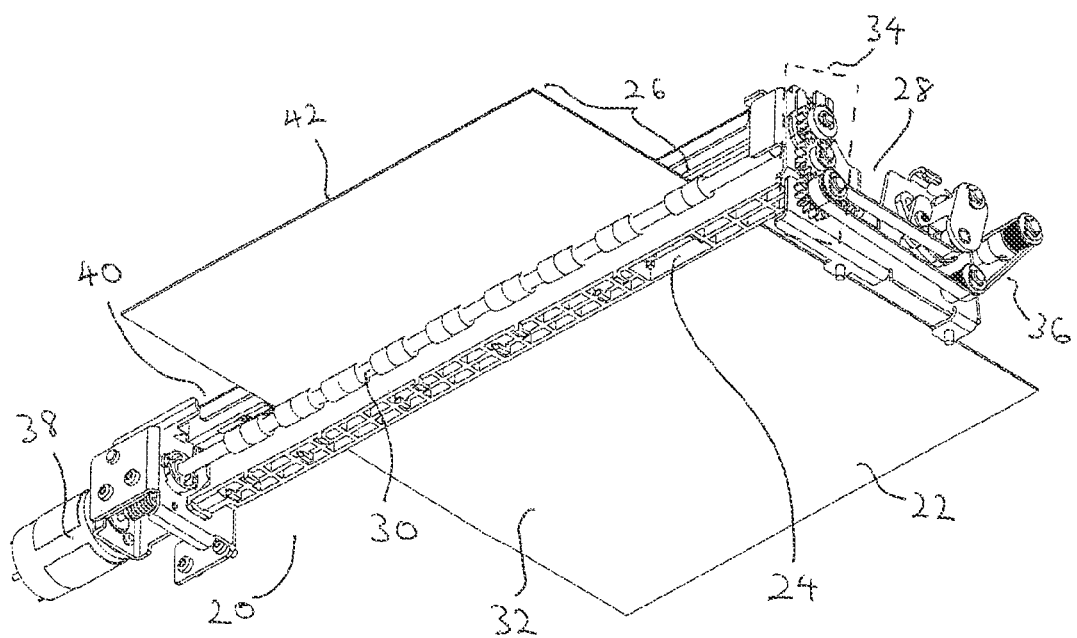
FIG. 2 shows a bottom perspective view of FIG. 1.

FIGS. 1 and 2 provide perspective views of a preferred embodiment of the apparatus of the present invention. FIGS. 3 to 6 provide detailed views of certain portions of the apparatus of the present invention.

Referring to FIGS. 1 and 2, there is provided an apparatus 20 for dispensing at least one segment 26 on a printed media sheet 22. The apparatus 20 may be coupled to a printer (not shown). The media sheet 22 may be at least one layer for receiving print content, such as, for example, a sheet of paper, a sheet of individual labels, a sheet of paper with perforations and so forth. The media sheet 22 may be provided in a form of a cylindrical roll, a fan-fold configuration or an edge-to-edge separable form.

The apparatus 20 includes a first detector 24 which is configured for determining a presence of the at least one segment 26 at a dispensing opening. The first detector 24 is either a light sensor which detects light when the at least one segment 26 is removed or a load sensor which detects removal of a load when the at least one segment 26 is removed. The at least one segment 26 should be in contact with the load sensor when the load sensor is used. However, the at least one segment 26 need not be in contact with the light sensor when the light sensor is used. In addition, the light sensor may not be effective when the at least one segment 26 is made from a material which allows light to pass through.

There is also a driving mechanism 28 included with the apparatus 20. The driving mechanism 28 is configured to move the media sheet 22 and correspondingly, the at least one segment 26, through the apparatus 20. The driving mechanism 28 includes an output drive roller 30 for contacting a first surface 32 of the media sheet 22 and for moving the media sheet 22. The output drive roller 30 is configured to move in a single direction, the single direction being enabled when the output drive roller 30 is coupled to a one-way clutch. Contacting the first surface 32 of the media sheet 22 with the output drive roller 30 provides frictional contact to enable movement of the media sheet 32. The driving mechanism 28 also includes a gear train 34 and a belt drive which will be described in greater detail at a subsequent section. Finally, the driving mechanism 28 is driven by a connected printer motor (not shown) in a manner which will also be described in greater detail at a subsequent section.

The apparatus 20 also includes a movable structure 40 for contacting a second surface 42 of the media sheet 32. Movement of the movable structure 40 may be modulated with a biasing mechanism, such as, for example, a torsion spring. The movable structure 40 is able to grip the media sheet 22 together with the output drive roller 30. There is a second detector 44 which is configured for determining a mode of the movable structure 40. The movable structure 40 is either in a non-contact mode or in a contact mode, the non-contact mode being when the movable structure 40 is not in contact with the second surface 42 of the media sheet 22 and the contact mode being when the movable structure 40 is in contact with the second surface 42 of the media sheet 22. The biasing mechanism aids in maintaining a position of the movable structure 40 when the movable structure 40 is in the contact mode. It should be appreciated that the movable structure 40 can also include rollers, whereby the rollers are the only portions of the movable structure 40 which contact the second surface 42 of the media sheet 22. The rollers aid in the movement of the media sheet 22. The rollers are visible in FIG. 5 (labeled as 64).

The second detector 44 is configured to determine the mode of the movable structure 40 using either direct or indirect motion of the movable structure 40. The second detector 44 is a sensor which is configured to be triggered when the movable structure 40 is in one of the modes. Further details of the second detector 44 will be provided in a subsequent section.

In the preferred embodiment, the movable structure 40 contacts the second surface 42 of the media sheet 22 when the first detector 24 determines the presence of the at least one segment 26 at a predetermined position, the predetermined position being at a dispensing opening. The at least one segment 26 may be singulated from the media sheet 22 when the at least one segment 26 is held at the predetermined position in the apparatus 20. The singulation of the at least one segment 26 from the media sheet 22 is carried out by either tearing or cutting of the at least one segment 26 from the media sheet 22. Tearing of the at least one segment 26 may be carried out by a user of the at least one segment 26 while cutting of the at least one segment 26 may be carried out either within the apparatus 20 or the printer. The at least one segment 26 may be ejected subsequent to being held at the predetermined position. For example, the output drive roller 30 may rotate and cause the at least one segment 26 which has been singulated to be removed from the apparatus 20. Furthermore, the driving mechanism 28 is also configured to back-track the media sheet 22 when the at least one segment 26 is singulated from the media sheet 22. It should be appreciated that a printer head of the printer is able to be capped when the at least one segment 26 is held at the predetermined position after the media sheet 22 has been back-tracked. Capping the printer head minimizes exposure time of the printer head and prolongs the life of the printer head.

The preceding paragraphs relating to FIGS. 1 and 2 provide an overview of the apparatus 20. FIGS. 3 to 6 support detailed descriptions for the main aspects of the apparatus 20. Specifically, FIGS. 3 and 4 support detailed descriptions for the driving mechanism 28 while FIGS. 5 and 6 support detailed descriptions for how the second sensor 44 operates.

Figure 3:
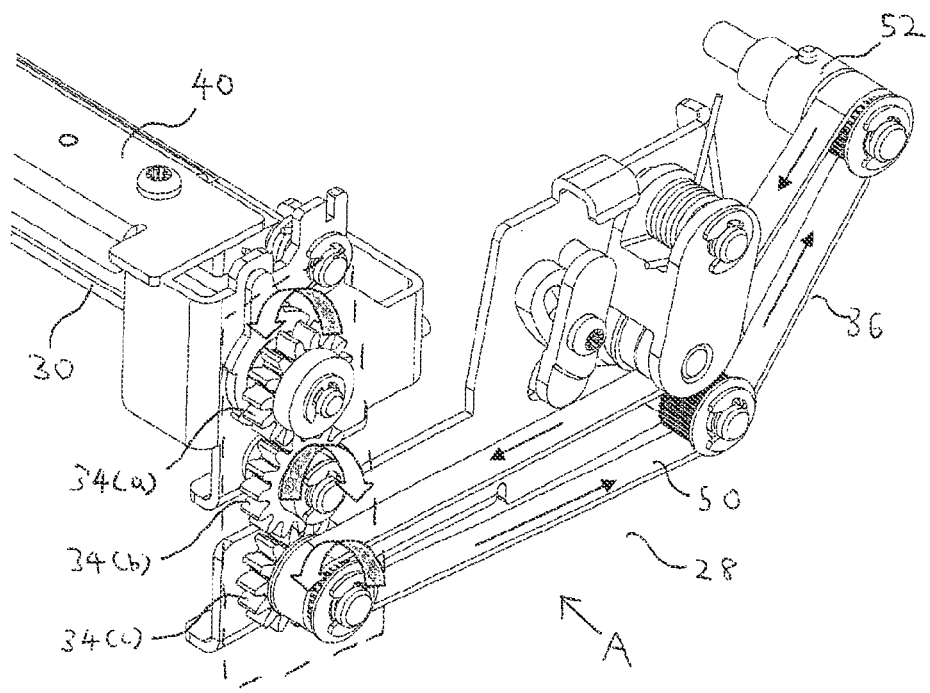
FIG. 3 shows a first perspective view of a media sheet drive system of FIG. 1.

Referring to FIG. 3 which shows the drive mechanism 28 when the output drive roller 30 is driven by the printer motor coupled to a media sheet roller 52 in an anti-clockwise direction (viewed from direction A), a belt drive 50 coupled to the media sheet roller 52 moves in an anti-clockwise direction. A third gear 34(c) of the gear train 34 which is coupled to the belt drive 50 also moves in an anti-clockwise direction. When the third gear 34(c) moves in an anti-clockwise direction, a second gear 34(b) of the gear train 34 moves in a clockwise direction and a first gear 34(a) moves in an anti-clockwise direction. In this embodiment, the belt drive 50 is coupled to a media sheet 22 roller 52 which moves in an anti-clockwise direction to feed a leading edge of a roll of the media sheet 22 towards the output drive roller 30. This paragraph describes how the media sheet 22 is fed to the output drive roller 30. The media sheet 22 is fed to the output drive roller 30 when the first sensor 24 detects removal of the at least one segment 26 from the apparatus 20. In this regard, once the first sensor 24 detects removal of the at least one segment 26 from the apparatus 20, the printer motor is activated to drive the media sheet roller 52 in an anti-clockwise direction.

Figure 4:
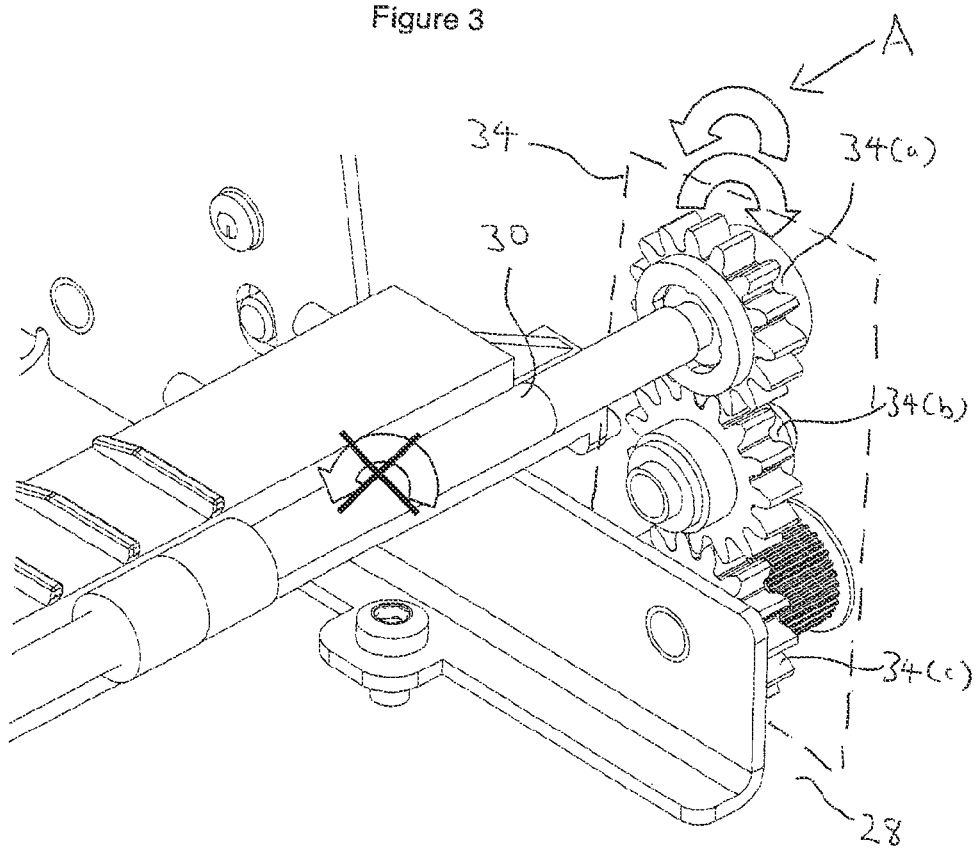
FIG. 4 shows a second perspective view of the media sheet drive system of FIG. 1.

Referring to FIG. 4, there is shown workings of the drive mechanism 28 when the media sheet 22 is back-tracked after singulation of the at least one segment 26. The output drive roller 30 includes a one-way clutch such that it only rotates in a single direction (the direction mentioned in the preceding paragraph). However, when the printer motor reverses direction from that of the preceding paragraph (clockwise direction viewed from direction A), the belt drive 50 coupled to the media sheet roller 52 also moves in a clockwise direction and consequently, the third gear 34(*c*) moves in a clockwise direction. Consequently, the second gear 34(*b*) of the gear train 34 moves in an anti-clockwise direction and the first gear 34(*a*) of the gear train 34 moves in a clockwise direction. When the media sheet 22 roller 52 moves in a clockwise direction, the output drive roller 30 does not rotate and this enables retraction of a leading edge of a roll of the media sheet 22 away from the output drive roller 30.

Figure 5:
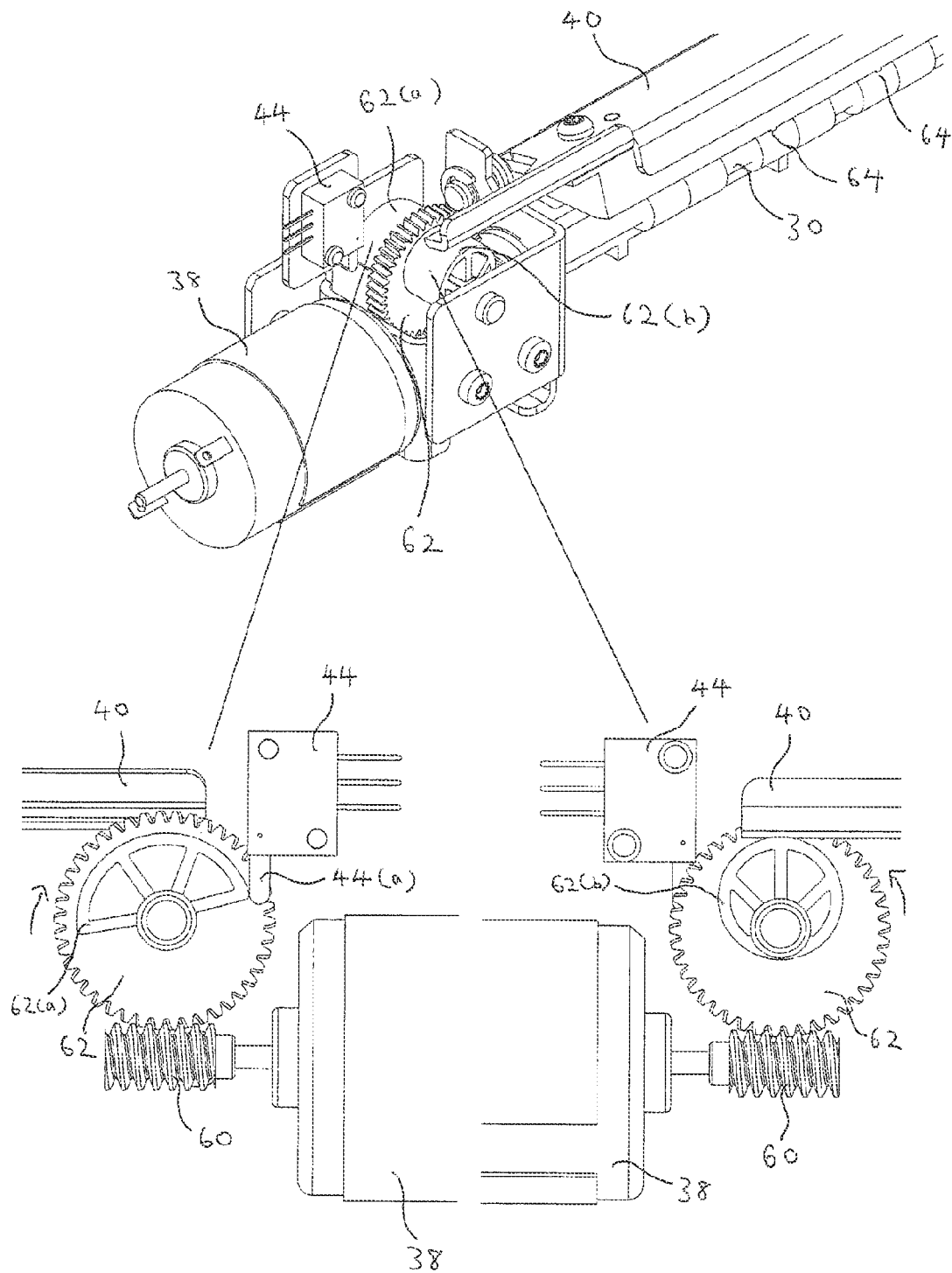
FIG. 5 shows a close up of a second sensor when a movable structure of FIG. 1 is at a non-contact mode.

Referring to FIG. 5, there is shown a close up view of the second sensor 44 when the movable structure 40 is in the non-contact mode. The movable structure 40 is in the non-contact mode when the first detector 24 detects removal of the at least one segment 26. A DC motor 38 drives a worm gear 60. The worm gear 60 consequently engages a cam 62, the cam 62 having a first half 62(*a*) and a second half 62(*b*).

Referring back to a directional conventions of the detailed description for FIGS. 3 and 4, when the output drive roller 30 is driven in an anti-clockwise direction, the cam 62 moves in an anti-clockwise direction (viewed from direction B) such that the second half 62(*b*) consequently lifts the movable structure 40 as the leading edge of the media sheet 22 is fed towards the output drive roller 30 after the first detector 24 detects removal of the at least one segment 26. The first half 62(*a*) simultaneously triggers a lever 44(*a*) of the second sensor 44 such that the apparatus 20 is able to determine the mode of the movable structure 40.

Figure 6:
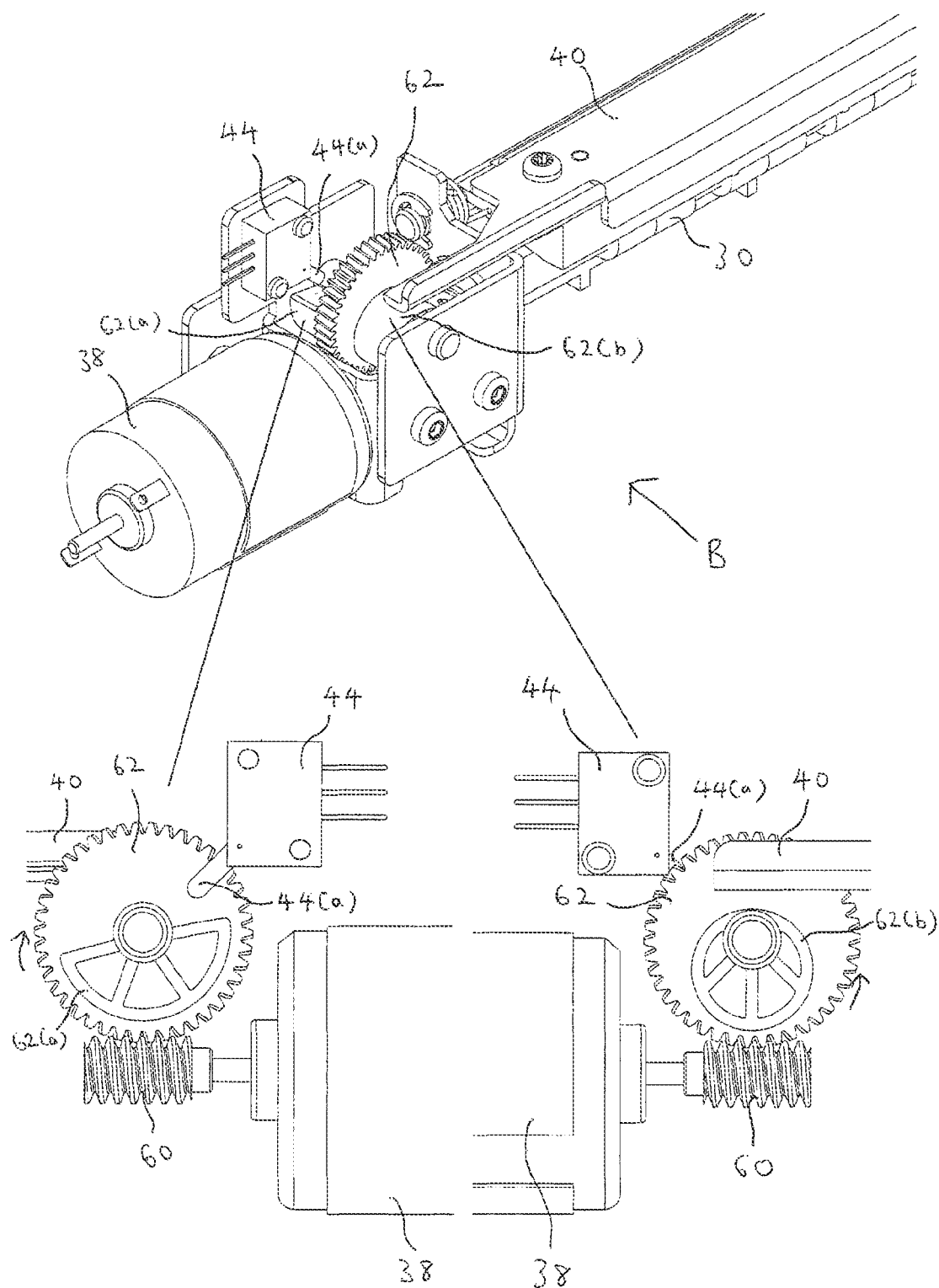
FIG. 6 shows a close up of a second sensor when a movable structure of FIG. 1 is at a contact mode.

Referring to FIG. 6 which also refers back to the directional conventions of the detailed description for FIGS. 3 and 4, the output drive roller 30 stops rotating (following on from FIG. 5) as the media sheet 22 stops moving. This may occur after the at least one segment 26 is singulated from the media sheet 22. The cam 62 continues to move in an anti-clockwise direction (viewed from direction B) such that the second half 62(*b*) consequently stops supporting the movable structure 40. The first half 62(*a*) simultaneously releases the lever 44(*a*) of the second sensor 44 such that the movable structure 40 is in a contact mode.

When the at least one segment 26 is removed from the apparatus 20, the first sensor 24 consequently instructs the apparatus 20 to initiate the operations as described using FIGS. 3 and 6.

It should be appreciated that the non-contact mode of the movable structure 40 ensures minimisation of transition error on the media sheet 22 used for printing.

Figure 7:
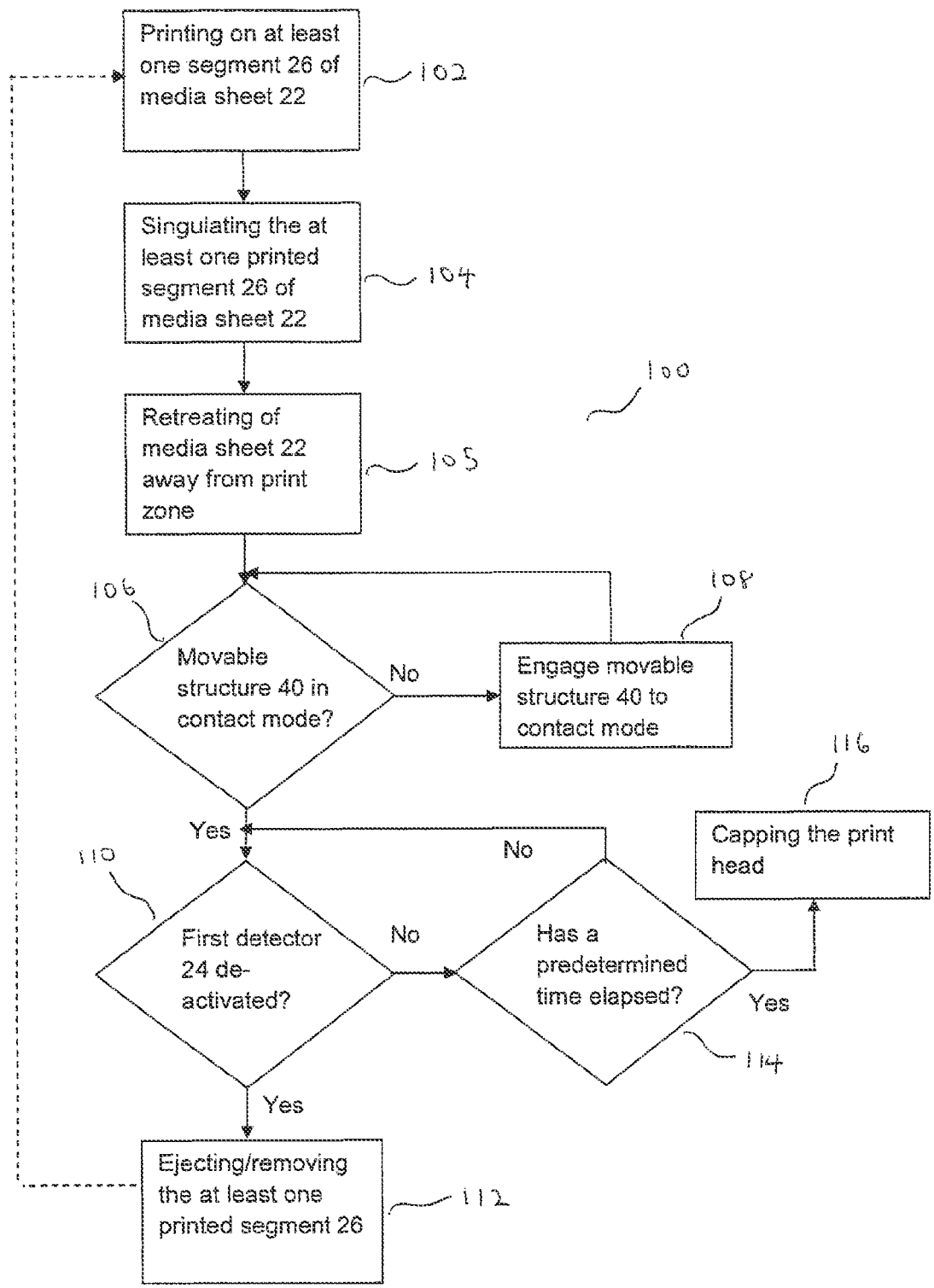
FIG. 7 shows a process flow of a preferred embodiment of a first method of the present invention.

Referring to FIG. 7, there is shown a first method 100 for dispensing at least one segment 26 on the printed media sheet 22 in the apparatus 20. It should be appreciated that the method 100 may also be usable for other dispenser devices. The method 100 includes printing on at least one segment 26 of the media sheet 22 (102). Subsequently, the method 100 includes singulating the at least one printed segment 26 of the media sheet 22 (104). The singulation of the at least one segment 26 from the media sheet 22 is carried out by either tearing or cutting of the at least one segment 26 from the media sheet 22. Tearing of the at least one segment 26 may be carried out by a user of the at least one segment 26 while cutting of the at least one segment 26 may be carried out either within the apparatus 20 or the printer.

The method 100 also includes retreating of the media sheet 22 (the remainder media sheet 22 excluding the at least one segment 26) away from a print zone (105). This clears an area around the print zone. In addition, the method 100 includes determining if the movable structure 40 is in a contact mode (106). This is carried out using the second sensor 44 as described earlier with reference to FIGS. 5 and 6. If the movable structure 40 is not in the contact mode, the movable structure 40 will then be engaged to contact mode (108).

Subsequently, the method 100 includes determining if the first detector 24 (as described in the preceding paragraphs) is de-activated (110). If the first detector 24 is de-activated, it means that the at least one segment 26 has been either ejected or removed from the apparatus 20 (112). After the at least one segment 26 has been ejected or removed from the apparatus 20, the method 100 may restart again to the printing on at least one segment 26 of the media sheet 22 (102). However, if the first detector 24 is not de-activated, a timer in the apparatus 20 determines if a predetermined time has elapsed (114). The predetermined time may be, for example, any duration between five to thirty seconds. If the predetermined time has elapsed, it would indicate that the at least one segment 26 is being held at the apparatus 20, and the printer head is capped (116) to minimize exposure of the print head. If the predetermined time has not elapsed, it means that the first detector 24 has been de-activated (110).

Figure 8:
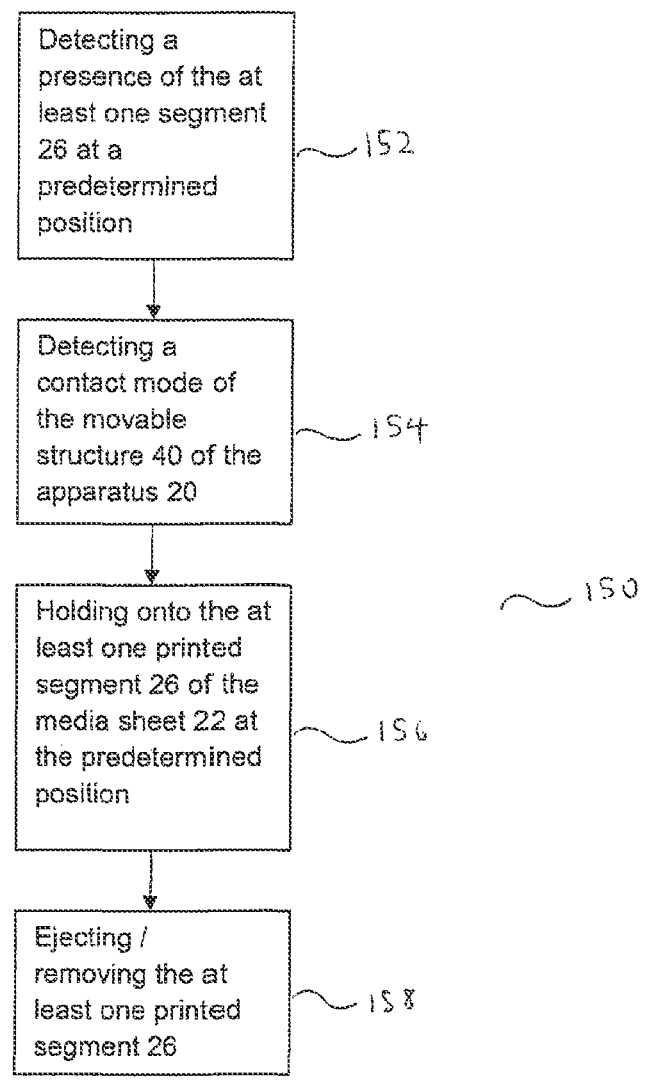
FIG. 8 shows a process flow of a preferred embodiment of a second method of the present invention.

Referring to FIG. 8, there is shown a second method 150 for dispensing at least one segment 26 on the printed media sheet 22 in the apparatus 20. It should be appreciated that the second method 150 involves a process carried out by the apparatus 20. The method 150 includes detecting a presence of the at least one segment 26 at a predetermined position, the predetermined position being at a dispensing opening (152). The detection of the presence of the at least one segment 26 may be carried out using the first sensor 24. The method 150 also includes detecting a contact mode of the movable structure 40 of the apparatus 20 (154). The detection of the contact mode may be carried out using the second sensor 44. In addition, the method 150 also includes holding onto the at least one printed segment 26 of the media sheet 22 at the predetermined position (156). Finally, the method 150 includes ejecting or removing the at least one segment 26 from the apparatus 20 (158).

It should be appreciated that the methods 100, 150 denote process flows which utilizes the various aspects of the apparatus 20 as described earlier. Correspondingly, usage of the methods 100, 150 also provide identical benefits as usage of the apparatus 20.

Whilst there has been described in the foregoing description preferred embodiments of the present invention, it will be understood by those skilled in the technology concerned that many variations or modifications in details of design or construction may be made without departing from the present invention.

The invention claimed is:

1. An apparatus for dispensing at least one segment on a printed media sheet with a plurality of segments, the apparatus configured to be coupled to a printer, the apparatus including:
   a first detector being configured for determining a presence of the at least one segment at a predetermined position, the predetermined position being at a dispensing opening;
   a driving mechanism for moving the media sheet, the driving mechanism being configured to back-track a remainder of the media sheet excluding the at least one segment away from a print zone when the at least one segment is singulated by cutting of the at least one segment from the media sheet when the at least one segment is held at the predetermined position, thereby clearing an area around the print zone in order to allow a printer head of the printer to be capped;
   an output drive roller;
   a movable structure for contacting a second surface of the media sheet, the movable structure being able to grip the media sheet together with the output drive roller to hold the at least one segment at the predetermined position; and
   a second detector being configured for determining a mode of the movable structure, the mode including a non-contact mode and a contact mode,
   wherein the movable structure is configured to contact the second surface of the media sheet when the first detector determines the presence of the at least one segment at the predetermined position and when the second detector determines that the mode of the movable structure is the non-contact mode.

2. The apparatus as claimed in claim 1, wherein the first detector includes a light sensor or a load sensor.

3. The apparatus of claim 1, wherein the non-contact mode being when the movable structure is not in contact with the second surface of the media sheet and the contact mode being when the movable structure is in contact with the second surface of the media sheet.

4. The apparatus of claim 1, wherein the at least one segment is a printed label.

5. The apparatus of claim 1, wherein movement of the movable structure is modulated with a biasing mechanism.

6. The apparatus of claim 1, wherein the output drive roller is configured to move in a single direction, the single direction being enabled when the output drive roller is coupled to a one-way clutch.

7. A method for dispensing at least one segment on a printed media sheet with a plurality of segments in the apparatus of claim 1, the method including:
   detecting a presence of the at least one segment at the predetermined position;
   detecting a mode of the movable structure of the apparatus;
   holding onto the at least one printed segment of the media sheet at the predetermined position;
   cutting the at least one printed segment of the media sheet from the media sheet when the at least one segment is held at the predetermined position; and
   back-tracking a remainder of the media sheet excluding the at least one segment away from a print zone when the at least one segment is singulated by cutting from the media sheet, thereby clearing an area around the print zone in order to allow the printer head of the printer to be capped.

8. The method as claimed in claim 7, wherein the at least one printed segment is a printed label.

* * * * *